United States Patent
Foran et al.

(10) Patent No.: US 12,179,677 B2
(45) Date of Patent: Dec. 31, 2024

(54) COMPOSITE MATERIAL VEHICLE CARGO COMPARTMENT CONSTRUCT

(71) Applicant: CONTINENTAL STRUCTURAL PLASTICS, INC., Auburn Hills, MI (US)

(72) Inventors: Hugh C. Foran, Auburn Hills, MI (US); Eric J. Haiss, Auburn Hills, MI (US); Matthew Plauman, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 284 days.

(21) Appl. No.: 17/792,512

(22) PCT Filed: Jan. 15, 2021

(86) PCT No.: PCT/US2021/013581
§ 371 (c)(1),
(2) Date: Jul. 13, 2022

(87) PCT Pub. No.: WO2021/146525
PCT Pub. Date: Jul. 22, 2021

(65) Prior Publication Data
US 2023/0057344 A1    Feb. 23, 2023

Related U.S. Application Data

(60) Provisional application No. 62/961,254, filed on Jan. 15, 2020.

(51) Int. Cl.
*B62D 33/02*    (2006.01)
*B32B 3/12*    (2006.01)
(Continued)

(52) U.S. Cl.
CPC ............. *B60R 13/01* (2013.01); *B32B 3/12* (2013.01); *B32B 7/12* (2013.01); *B32B 15/08* (2013.01);
(Continued)

(58) Field of Classification Search
CPC .... B62D 33/023; B62D 33/02; B62D 33/027; B62D 33/0273; B62D 33/044;
(Continued)

(56) References Cited

U.S. PATENT DOCUMENTS 5,705,764 A * 1/1998 Schade ................. F41H 5/0428
                                                                        89/36.02
6,022,062 A * 2/2000 Fleenor .............. B62D 25/2054
                                                                          410/94
(Continued)

FOREIGN PATENT DOCUMENTS

CN             1657275      *   8/2005
CN       203473027 U    *   3/2014
(Continued)

OTHER PUBLICATIONS

CN203473027 Text (Year: 2014).*
(Continued)

*Primary Examiner* — Dennis H Pedder
(74) *Attorney, Agent, or Firm* — MaxGoLaw PLLC (57) ABSTRACT

A vehicle cargo construct including a floor, a plurality of side wall panels extending from the floor, and an end wall panel extending from the floor between the plurality of side wall panels. The floor has an exterior surface and an oppositely opposed interior surface. Each of the plurality of side wall panels has an exterior surface and an oppositely opposed interior surface. The has an exterior surface and an oppositely opposed interior surface. Each of the floor, the plurality of side wall panels, and the end wall panel are (Continued)

formed of a composite sandwich panel material formed including an open area core defining a plurality of pores disposed between a backing sheet and a surface sheet formed of a sheet molding composition (SMC) reinforced with unidirectional fibers.

16 Claims, 6 Drawing Sheets (51) Int. Cl.
*B32B 7/12* (2006.01)
*B32B 15/08* (2006.01)
*B32B 27/08* (2006.01)
*B32B 27/20* (2006.01)
*B60R 13/01* (2006.01)
*B62D 29/00* (2006.01)
*B62D 29/04* (2006.01)
*B62D 33/023* (2006.01)
*B62D 33/04* (2006.01)

(52) U.S. Cl.
CPC ............ *B32B 27/08* (2013.01); *B32B 27/20* (2013.01); *B62D 29/00* (2013.01); *B62D 29/043* (2013.01); *B62D 33/02* (2013.01); *B62D 33/023* (2013.01); *B62D 33/044* (2013.01); *B62D 33/046* (2013.01); *B32B 2250/03* (2013.01); *B32B 2250/40* (2013.01); *B32B 2262/106* (2013.01); *B32B 2307/516* (2013.01); *B32B 2307/7246* (2013.01); *B32B 2307/732* (2013.01); *B32B 2605/00* (2013.01)

(58) Field of Classification Search
CPC .... B62D 33/046; B62D 33/048; B62D 29/00; B62D 29/04; B62D 29/043; B62D 22/023; B62D 22/02; B62D 22/027; B62D 22/0273; B62D 22/040044; B62D 22/046; B62D 22/048

USPC .............. 296/181, 2, 3, 4, 182.1, 183.1
See application file for complete search history.

(56) References Cited

U.S. PATENT DOCUMENTS

| | | | |
|---|---|---|---|
| 6,176,537 | B1 | 1/2001 | Doshi |
| 6,986,540 | B2 * | 1/2006 | Augustine .......... B62D 25/2072 |
| | | | 296/181.3 |
| 11,465,478 | B2 * | 10/2022 | Facchinello ............ B60J 10/90 |
| 2001/0035661 | A1 | 11/2001 | Doshi |
| 2008/0174149 | A1 | 7/2008 | Simms et al. |
| 2012/0177877 | A1 * | 7/2012 | Lebail ...................... C08K 3/22 |
| | | | 428/116 |
| 2014/0130657 | A1 | 5/2014 | Pilpel et al. |
| 2015/0130105 | A1 * | 5/2015 | Preisler .................. B29C 43/18 |
| | | | 264/258 |
| 2015/0132532 | A1 | 5/2015 | Preisler et al. |
| 2019/0276134 | A1 * | 9/2019 | Huber ....................... B64C 1/20 |
| 2019/0283361 | A1 * | 9/2019 | Jia ........................... B32B 5/024 |
| 2023/0382209 | A1 * | 11/2023 | Facchinello ........... B60J 7/0084 |

FOREIGN PATENT DOCUMENTS

| | | |
|---|---|---|
| CN | 208515703 U | 2/2019 |
| CN | 208827695 U | 5/2019 |
| JP | 2001097249 A | 4/2001 |
| WO | 2015164353 A1 | 10/2015 |

OTHER PUBLICATIONS

CN1657275 Text (Year: 2005).*
Int'l Search Report for PCT/US2021/013581, dated May 6, 2021.
Supplementary European Search Report issued in European Patent Appln. No. EP21741194, dated Jan. 29, 2024.

* cited by examiner

COMPOSITE MATERIAL VEHICLE CARGO COMPARTMENT CONSTRUCT

CROSS-REFERENCE TO RELATED APPLICATION

This application claims priority of U.S. Provisional Patent Application Ser. No. 62/961,254 filed Jan. 15, 2020, which is incorporated herein by reference.

FIELD OF THE INVENTION

The present invention in general relates to composite materials and in particular to a vehicle cargo bed and pickup truck box formed with a composite open area core sandwich structure.

BACKGROUND OF THE INVENTION

Lightweight and heavy duty trucks, such as pickups and sport utility vehicle have become increasingly popular for both business and personnel use. These vehicles are typically equipped with features and accessories to store and transport cargo, such as a generally horizontal truck bed and generally vertically oriented walls extending therefrom that together define a cargo compartment. Typical truck beds and walls defining cargo compartments are formed of steel, in order to withstand the typical wear and tear exerted upon truck beds and walls defining cargo compartments.

Weight savings in the automotive, transportation, and logistics based industries has been a major focus in order to make more fuel efficient vehicles. In order to reduce the weight of components associated with truck beds and walls defining cargo compartments, attempts have been made to form truck beds and walls defining cargo compartments out of aluminum; however, such truck beds and walls defining cargo compartments are easily punctured by objects placed in the cargo compartments during ordinary use. To avoid such punctures, other scratches, or damage to the truck bed and walls defining cargo compartments resulting from usual pickup truck use, users typically install a robust polymeric liner within the cargo compartment to cover the steel or aluminum truck bed and walls defining cargo compartments. Such truck bed liners are an added expense to consumers, add to the weight of the vehicle, and reduce the usable space available within the cargo compartment.

In order to achieve weight savings in other areas of vehicles, light weight composite materials have been introduced to take the place of typical metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials.

A sandwich-structured composite is a special class of composite material that is fabricated by attaching two thin but stiff skins to a lightweight but thick core. The core material is normally a low strength material, but its higher thickness provides the sandwich composite with high bending stiffness with overall low density. While sandwich structures have previously been developed to provide strength and reduced weight, a conventional problem with sandwich structures is that the edges are ineffective and allow for infiltration of humidity or moisture that becomes entrained within the core and often inconsistent with finished vehicle surface requirements. With temperature extremes this entrained moisture can reduce the operational lifetime of the structure, while increasing the weight thereof. These problems of moisture infiltration are particularly pronounced in instances when the core is formed of cellulosic materials such as paper. Accordingly, such composite structures have been unsuitable for forming truck beds and walls defining cargo compartments given that such areas of a vehicle are openly exposed to the elements.

Thus, there exists a need for a light weight yet robust truck bed and walls defining cargo compartments capable of withstanding typical wear and tear and environmental elements experienced by truck cargo compartments.

SUMMARY

The present invention provides a vehicle cargo construct that includes a floor, a plurality of side wall panels extending from the floor, and an end wall panel extending from the floor between the plurality of side wall panels. The floor has an exterior surface and an oppositely opposed interior surface. Each of the plurality of side wall panels has an exterior surface and an oppositely opposed interior surface. The has an exterior surface and an oppositely opposed interior surface. Each of the floor, the plurality of side wall panels, and the end wall panel are formed of a composite sandwich panel material formed including an open area core defining a plurality of pores disposed between a backing sheet and a surface sheet formed of a sheet molding composition (SMC) reinforced with unidirectional fibers.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

The present invention has utility as a light weight yet robust vehicle cargo bed and pickup truck box formed with a composite open area core sandwich structure capable of withstanding typical wear and tear and environmental elements experienced by truck cargo compartments. The use of the composite sandwich structure allows for replacement of traditional materials such as steel or aluminum, without a loss of strength, in a vehicle's cargo bed or pickup truck box while also reducing the overall weight of the vehicle. Additionally, the present invention has utility as components for forming a cargo bed or pickup truck box structure having a robust surface suitable for lining a truck cargo compartment, while being a high strength, light weight, an impact resistant vehicle component. Embodiments of the present invention also have utility as watertight and waterproof composite sandwich panel structures.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Figure 1:
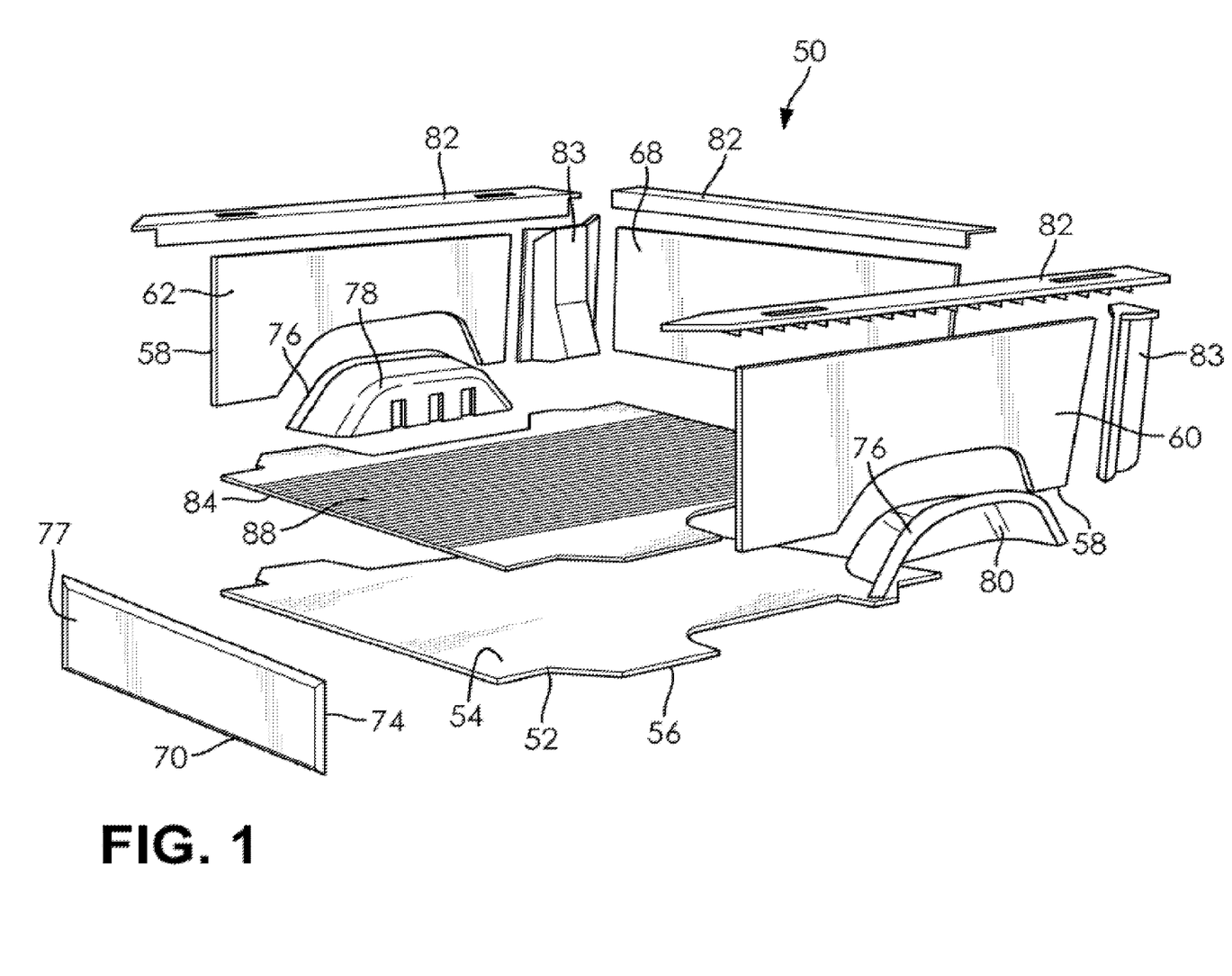
FIG. 1 shows an exploded perspective view of an inventive vehicle cargo construct according to embodiments of the present invention.

Referring now to the figures, FIG. 1 shows an exploded perspective view of an inventive vehicle cargo construct 50 according to embodiments of the present invention. According to embodiments, the vehicle cargo construct 50 includes a floor 52, a plurality of side wall panels 58 extending from said floor 52, and an end wall panel extending 64 from said floor 52 between the side wall panels 58. The floor 52 has an exterior surface 54 and an oppositely opposed interior surface 56. According to embodiments, the floor 52 includes a plurality of ridges defined in the exterior surface 54. Each of the side wall panels 58 has an interior surface 60 and an oppositely opposed exterior surface 62. The end wall panel 64 has an interior surface 66 and an oppositely opposed exterior surface 68. According to embodiments, the floor 52, the side wall panels 58, and the end wall panel 64 are formed of a composite sandwich panel material 10, such as that shown in FIGS. 2-5. The composite sandwich panel material 10 includes an open area core 12 with walls 26 defining an ordered array of pores 24 terminating in faces 17 and 17', the open area core 12 disposed between a surface sheet 14 and a backing sheet 16. The surface sheet 14 is formed of a thermoplastic material or sheet molding composition (SMC) reinforced with unidirectional fibers. According to embodiments, the surface sheet 14 is adhered to a first face 17 of the open area core 12 by a first adhesive layer 20, and a backing sheet 16 adhered to a second face 17' of the open area core 12 by a second adhesive layer 22. According to embodiments, the surface sheet 14 and the backing sheet 16 are each adhered to opposite sides of the open area core with an adhesive or glue that is viscous when applied.

Figure 2:
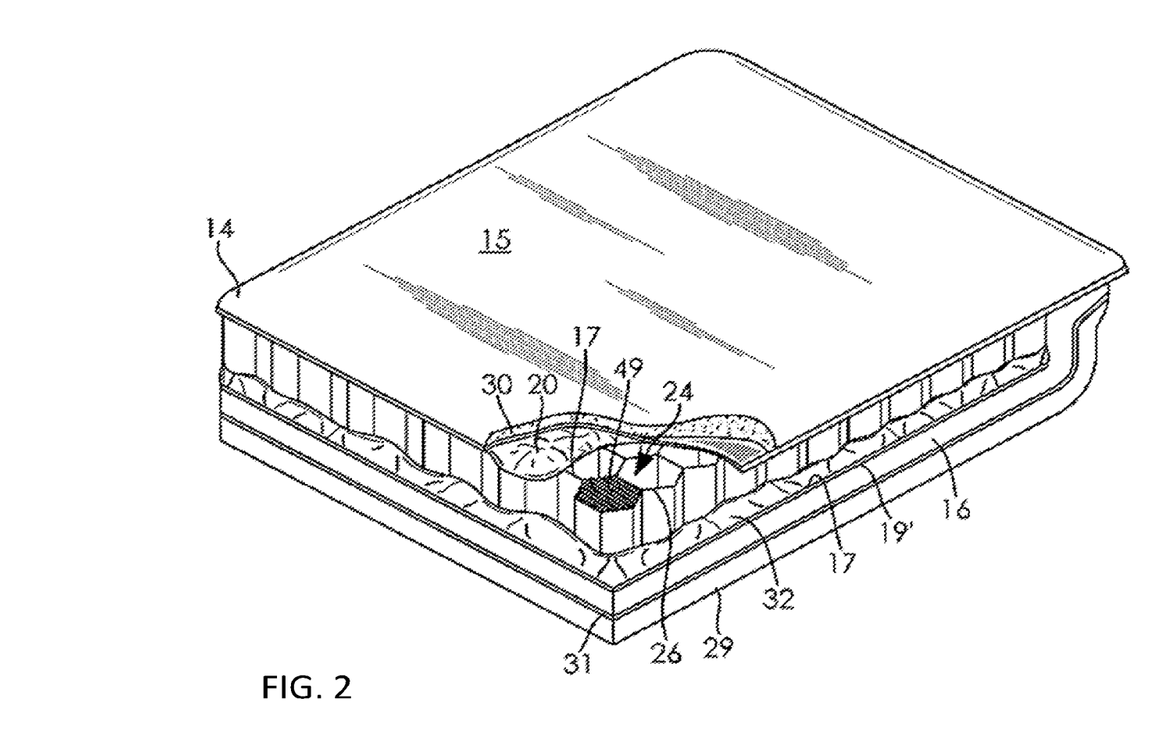
FIG. 2 is a partial cutaway, perspective view of a composite sandwich panel material used to form embodiments of the inventive cargo construct.
Figure 3:
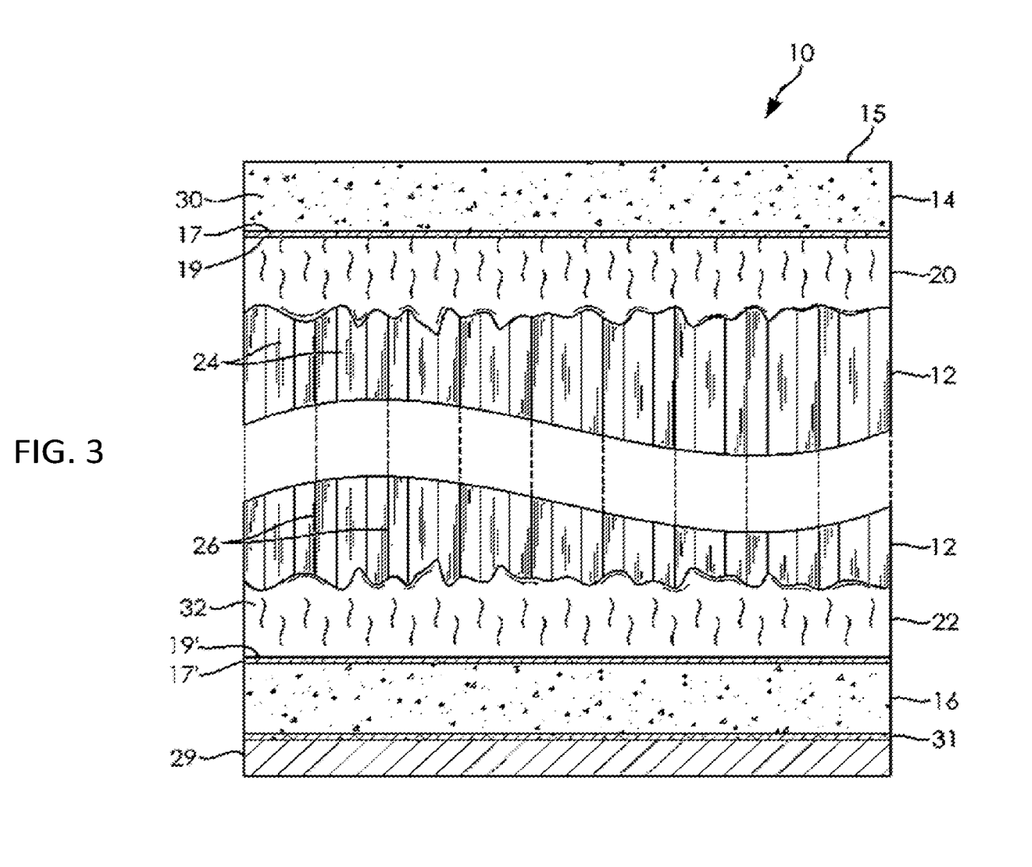
FIG. 3 is an enlarged partial cutaway, side view of the composite sandwich panel material of FIG. 2 along a line bisecting the hexagonal pores.

As shown in FIG. 2, a portion of the surface sheet 14 is cutaway to reveal the adhesive 20, a cloth, if present; and the open area core 12. The surface sheet 14 is adhered to a first side of the open area core 12 by a first adhesive layer 20. According to embodiments, the surface sheet 14 presents an outwardly facing hard yet brittle skin 15. FIG. 3 is an enlarged cross-sectional view of a composite sandwich panel material 10 used to form the inventive cargo construct 50 according to embodiments of the invention. FIG. 3 shows further details of the various layers making up the composite sandwich panel material 10. In some embodiments, a cloth 19 is present intermediate between the face 17 of the open area core 12 and the surface sheet 14, the cloth 19 being embedded within the adhesive 20. According to embodiments, the backing sheet 16 is adhered to an opposing second side of the open area core 12 by a second adhesive layer 22. In some embodiments, a cloth 19' is present intermediate between the face 17' of open area core 12 and the backing sheet 16, the cloth 19' being embedded within the adhesive 22.

According to embodiments, the open area core 12 is formed of a lightweight, resilient material that defines a plurality of pores 24 so as to reduce the overall density of the open area core 12. The open area core 12 is formed from a variety of materials that include thermoplastics such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer or metal such as aluminum or an alloy thereof where at least one of the aforementioned metals constitutes the majority by weight of the alloy. The open area core 12 is relatively soft compared to the hard surface sheet 14. The open area core 12 is formed of a material that is able to absorb forces of impacts. The top edges of the walls 26 that define the pores 24 in certain embodiments of the open area core such as 12 form an array of various shapes, such as hexagonal, circular, rhomboidal, triangular, parallelogram quadrilateral, and regular quadrilateral, honeycombs, diamonds, squares, triangles, parallelograms, circles, or a combination thereof. In some embodiments, the ratio of the thickness of a wall 26 to the maximal linear extent between faces 17 and 17' is between 0.01-10:1. A wall thickness ranges from 0.1 mm to 100 mm in such embodiments.

According to embodiments that include the adhesive layers 20, 22, the adhesive layers 20, 22 are formed of either a thermoplastic or curable formulation, a polyurethane or polyurethane prepolymer adhesive, which may be in the form of glue, a moisture cure adhesive, a reactive hot melt adhesive, or a polyurethane resin. As shown in FIG. 3, due to the compressive force applied to the adhesive layers 20, 22 between the surface sheet 14 and the open area core 12 and the backing sheet 16 and the open area core 12, the adhesive 20, 22 is engineered to have an initial viscosity on contact with the face 17 and the walls 26 so as partially fill the pores 24 of the open area core 12. The viscosity of the adhesive layers 20, 22 ensures that the adhesive does not excessively run into the pores defined in the open area core before the adhesive attains final strength. Accordingly, the adhesive surface area for adhesion between a surface sheet and backing sheet and the open area core is at least 5% more than surface area of the walls at the face. This increased surface area of adhesion reduces delamination of the components of the composite sandwich 10.

The surface sheet 14 of the composite sandwich panel 10 is formed from a thermoplastic material or sheet molding compound (SMC) reinforced with unidirectional fibers. The surface sheet 14 is a high strength, hard, rigid, and brittle material. According to embodiments, the unidirectional reinforcing fibers are carbon fibers. The surface sheet 14 can further include a filler material 30 to reinforce and/or serve to decrease the weight of the surface sheet 14. The filler material 30 is any of glass fibers, carbon fibers, natural fibers, hollow or solid glass microspheres, or a combination thereof. The fibers may be oriented or non-oriented. Typical thicknesses of the surface sheet 14 in the present invention range from 0.5 to 4 millimeters (mm) without regard to edges.

The backing sheet 16 is disposed the second side of the open area core 12 and according to some embodiments is adhered to the open area core 12 by the second adhesive layer 22. According to embodiments. the backing sheet 16 is formed of a fiber mat having non-oriented, non-woven fibers, unidirectional, or woven fibers, a thermoplastic sheet, an SMC sheet dicyclopentadiene (DCPD), overmolded polyurethane (PU), or a combination thereof. The backing sheet 16 provides a robust and durable surface. In some embodiments, the backing sheet 16 terminates against the backside of the surface sheet 14 to encapsulate the open area core 12.

According to certain embodiments, the composite sandwich panel material 10 provides sound damping, fire retardancy, thermal insulation, or a combination thereof by placing a sound and/or heat absorbing material within the pores 24 of the open area core 12. According to embodiments, the pores 24 of the open area core 12 are at least partially filled with a fill 49. The fill illustratively including foam pellets, fire retardant, or a phase change material. Phase change materials operative herein include waxes or an inorganic salt hydrates.

The surface sheet 14 and the backing sheet 16 are joined together along an edge 33A-33D of the composite sandwich panel material 10 to form a seal, as shown in FIGS. 4A-4D, respectively. In certain embodiments in which all of the edges of the composite sandwich panel assembly 10 are sealed, the open area core 12 is fully enclosed and moisture is inhibited from entering the interior of the composite sandwich panel assembly 10. Given that the components of the inventive cargo construct 50 formed of the composite sandwich panel assembly 10 are exposed to natural elements including sun, snow, humidity, and rain, preventing moisture from entering the interior of the composite sandwich panel material 10 is important given that any moisture therein significantly increases the weight of the vehicle and freeze thaw cycles of moisture within the part cause expansion and potentially failure of the composite sandwich panel material 10, leading to damage to the vehicle cargo construct 50.

FIGS. 4A-4D show various embodiments of ways in which the surface sheet 14 and the backing sheet 16 are joined together to form a sealed edge 33A-33D, respectively according to the present disclosure. In some inventive embodiments an elastomeric gasket 34 is disposed between the surface sheet 14 and the backing sheet 16 at the 33C to make the edge 33C more water resistant. It is appreciated that a gasket is readily included in the other edge joinder 33A, 33B, and 33D. The gasket 35 enhances maintenance of the edge seal over a wider range of use conditions.

As will be understood by one having ordinary skill in the art, to form an edge seal between the surface sheet 14 and the backing sheet 16, at least one of the surface sheet 14 and the backing sheet 16 requires enough material to wrap around the edge of the composite sandwich 10. According to embodiments, at least one of the surface sheet 14 and the backing sheet 16 is provided in dimensions greater than the dimensions of the final composite part such that the material is able to wrap around the final edge composite sandwich 10. According to certain embodiments, the at least one of the surface sheet 14 and the backing sheet 16 is preformed such that it has edges extending generally perpendicularly from the plane of the sheet material.

Figure 4A:
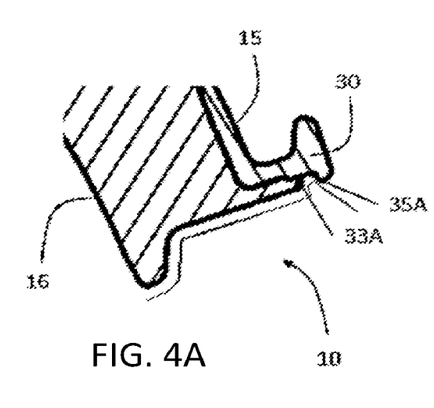
FIGS. 4A-4D are cross-sectional views of edges of a composite sandwich panel material.
Figure 4B:
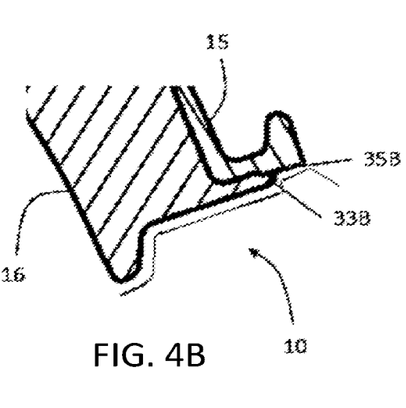
Figure 4C:
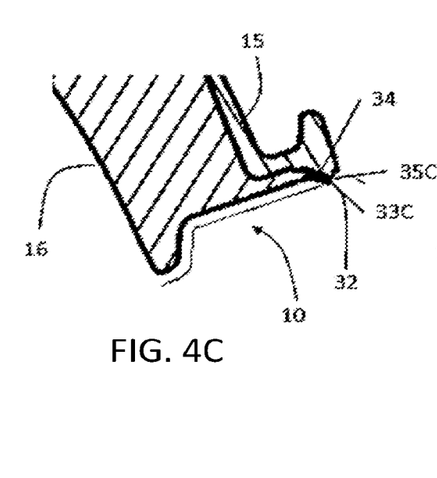
Figure 4D:
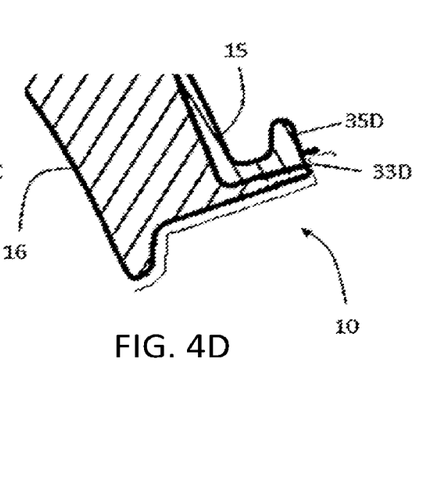

According to embodiments, excess material is cut from the composite sandwich once the edge seal is formed. As shown in FIG. 4A, excess material of the backing sheet 16 has been trimmed from the composite sandwich assembly 10 by a knife or router that presses against the divot 35A that is formed by the surface sheet 14. In FIG. 4B, the edge 33B formed by removing excess material for tool engagement against a shoulder 35B of the surface sheet 14. In FIG. 4C, the edge 33C formed by removing excess material for tool engagement against a shoulder 35C of the surface sheet 14. Also, as shown in FIG. 4D, excess material of one or both the surface sheet 14 and the backing sheet 16 are trimmed with tool pressure against shoulder 35D.

Figure 5:
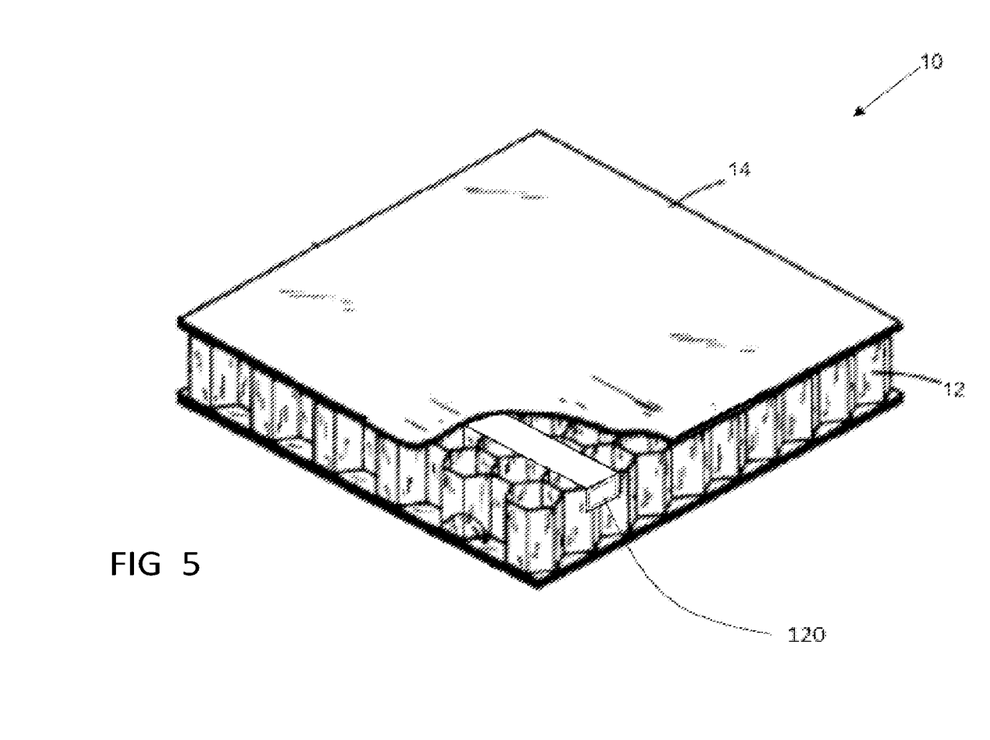
FIG. 5 is a partial cutaway, perspective view of a composite sandwich panel material having a conduit used to form embodiments of the inventive component construct.

As shown in FIG. 5, embodiments of an inventive vehicle cargo construct 50 include a conduit system 120 embedded within the composite sandwich panel material 10 of the vehicle component. As shown in FIG. 5, the conduit system 120 is embedded in the open area core 12 of composite sandwich panel assembly 10 that forms the vehicle cargo construct 50. According to embodiments, the conduit system 120 comprises tubing or wires that are molded into the open area core 12 of the composite sandwich 10 before the vehicle component is formed. According to embodiments, the conduit system 120 includes electrical wiring, ventilation ducts, or heating elements. Accordingly, embodiments of the inventive vehicle cargo construct 50 are capable of including features such as speakers, lights, air vents, and defrosting elements for removing ice or snow present on the vehicle cargo construct 50. The conduit systems 120 of various vehicle components are configured to align with one another to form a single connected conduit system throughout the vehicle to connect electrical wiring, ventilation ducts, and/or heating elements of each of an inventive vehicle cargo construct with like electrical wiring, ventilation ducts, and/or heating elements of the vehicle to function.

According to embodiments, the floor 52, the side wall panels 58, and the end wall panel 64 of the vehicle cargo construct 50 are integrally formed of a single piece of composite sandwich panel material 10 or each piece is formed of a separate piece of composite sandwich panel material 10. Accordingly, the vehicle cargo construct 50 is a single unitary construct that is configured to be attached to a vehicle frame and a vehicle body according to some embodiments. Alternatively, the vehicle cargo construct 50 is formed a several separate pieces that are configured to be joined together and to a vehicle frame and vehicle body. In instances in which the vehicle cargo construct 50 is formed of a single piece of composite sandwich panel material 10, the cargo construct 50 is formed by folding the side walls 58 and the end wall 64 up from the plane of the floor 54. According to embodiments, the folding includes crushing portions of the composite sandwich panel material 10, particularly the open area core 12 along the fold lines.

Figure 6:
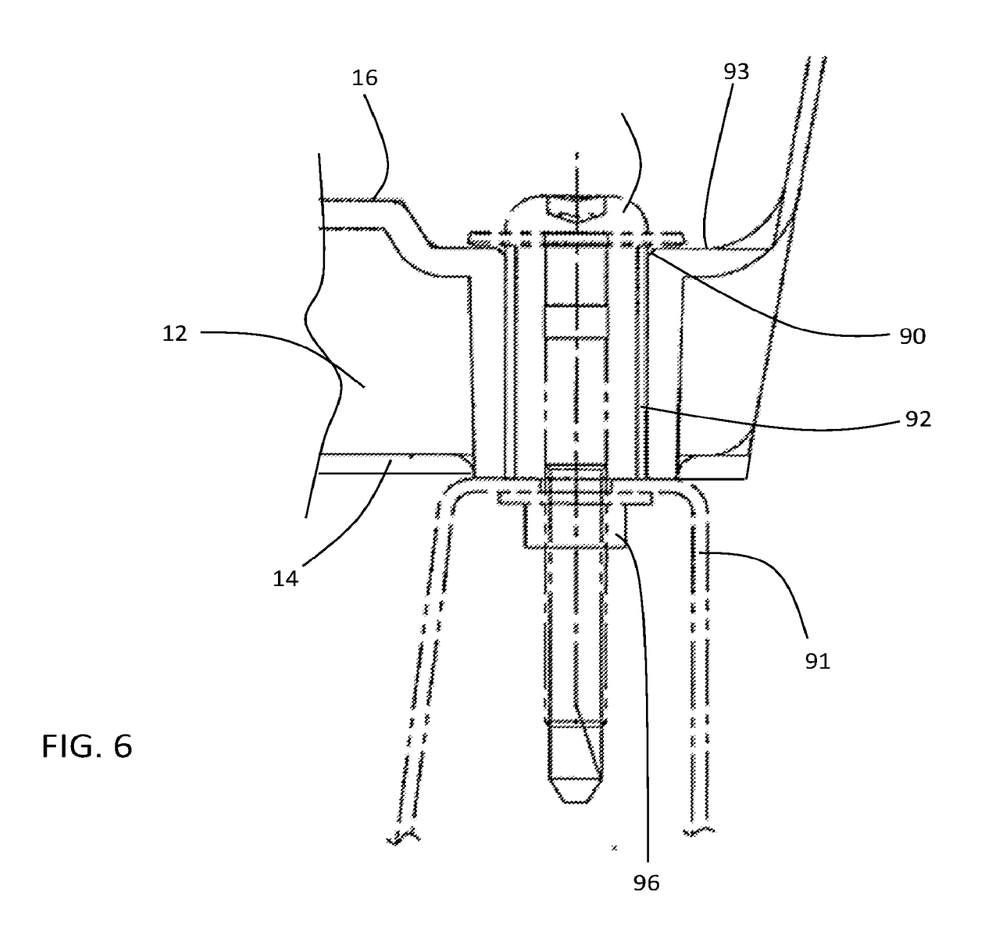
FIG. 6 is an enlarged cross-sectional view of the inventive vehicle cargo construct attached to a vehicle frame or internal structural body component according to embodiments of the present invention.

According to embodiments, the floor 52, the side wall panels 58, and/or the end wall panel 64 of the vehicle cargo construct 50 include a plurality of hard points 90, as shown in FIG. 6. The hard points 90 are configured to be points at which the vehicle cargo construct 50 is attached to the vehicle frame or internal structural body components 91. According to embodiments, the hard points 90 are through holes defined in the composite sandwich panel material 10 that forms the vehicle cargo construct 50. According to embodiments, a fastener, such as a bolt 94, is inserted through the hard point 90 and through an opening defined in the vehicle frame 91, securing the vehicle cargo construct 50 to the vehicle frame or internal structural body components 91 using a nut 96. According to embodiments, the hard points 90 are formed in mounting recesses 93 that are formed in the backing sheet surface of the composite sandwich panel material 10, thus allowing the head of the fastener 94 to be recessed into the mounting recess 93 so that the head of the fastener 94 is flush with the surface of the cargo compartment that is defined by the backing sheet 16 of the composite sandwich panel material 10. According to embodiments, the hard points 90 include a collar 92 disposed within the through hole that forms the hard point 90. The collar 92 may be inserted into the through hole defined by the composite sandwich panel material 10 after the through hole is formed in the composite sandwich panel material 10 or the collar 92 may be pre-positioned and the composite sandwich panel material 10 formed around the collars 92.

According to embodiments, the exterior surface 54 of the floor 52 is defined by the surface sheet 14 of the composite sandwich panel material 10 and the oppositely opposed interior surface 56 of said floor 52 is defined by the backing sheet 16 of the composite sandwich panel material 10. According to embodiments, the exterior surface 62 of each of the side wall panels 58 is defined by the surface sheet 14 of the composite sandwich panel material 10 and the oppositely opposed interior surface 60 of each of the side wall panels 58 is defined by the backing sheet 16 of the composite sandwich panel material 10. According to embodiments, the exterior surface 68 of the end wall panel is defined by the surface sheet 14 of the composite sandwich panel material 10 and the oppositely opposed interior surface of the end wall panel is defined by the backing sheet 16 of the composite sandwich panel material 10.

According to embodiments, the exterior surface 54 of the floor 52, the exterior surface 62 of each of the side walls 58, and the exterior surface 68 of the end wall 64 define a cargo compartment within the vehicle cargo construct 50. Given that these surfaces are defined by the surface sheet 14 of the composite sandwich panel 10, these surfaces that define the cargo compartment are high strength, robust, hard, and resistant to scratches, punctures, and other damage. The oppositely opposed interior surfaces 56, 60, 66 face the body components.

According to embodiments, the vehicle cargo construct 50 additionally includes a second end wall panel 70 extending from the floor 52 between the side wall panels 58. According to embodiments the second end wall panel 70 is formed a separate piece of the composite sandwich panel 10. The second end wall panel 70 has an exterior surface 74 and an oppositely opposed interior surface 72. According to embodiments, the exterior surface 74 of the second end wall panel 70 is defined by the surface sheet 14 of the composite sandwich panel material 10 and the oppositely opposed interior surface 72 of the second end wall panel 70 is defined by the backing sheet 16 of the composite sandwich panel material 10. According to embodiments, the second end wall panel 70 is a tailgate attached to the floor 52 by a hinge. Thus, the second end wall panel 70 is configured to pivot about the hinge to open and close the end of the containment construct 50, thereby allowing a user access to the cargo compartment within the vehicle cargo construct 50 when the tailgate 70 is in its open position and enclosing the cargo compartment within the vehicle cargo construct 50 when the tailgate 70 is in its closed position.

According to embodiments, any of the side wall panels 58 and/or the end wall panels, 64, 70 are formed of a double wall of composite sandwich panel material 10. In such embodiments, a void may be formed between the two walls of composite sandwich panel material 10. Within such a void, at least one compartment for housing various items is formed. The compartment may have a locking door formed in either one or both of the surrounding walls of composite sandwich panel material 10. Accordingly, items such as tools may be securely stored within the vehicle cargo construct 50.

According to embodiments, the vehicle cargo construct 50 additionally includes a plurality of wheel wells 76 each having an exterior surface 78 and an interior surface 80. Each of the wheel wells 76 configured to receive a wheel of the vehicle on the side of the interior surface 80 of the wheel well 76 and partially surround the wheel of the vehicle. According to embodiments, the plurality of wheel wells 76 are defined by and are integrally formed with each of the side wall panels 58. Alternatively, the wheel wells 76 are structures formed separately from the side wall panels 58. Each of the wheel wells 76 is positioned between one of the side wall panels 58 and the floor 52.

According to embodiments, the vehicle cargo construct 50 additionally includes a plurality of cap sections 82 positioned along an upper edge of any or all of the side wall panels 58, the end wall panel 64, and the second end wall panel 70. According to embodiments, the cap sections 82 are formed of the composite sandwich panel material 10. The cap section 82 may be integrally formed with the panel from which it extends or may be formed of a separate piece of composite sandwich material 10 that is then attached to the corresponding panel to form the vehicle cargo construct 50.

According to embodiments, the vehicle cargo construct 50 additionally includes a plurality of shoulders 83. The shoulders 83 are configured to join and/or cover the corner edges of the wall sections 58, 64. The shoulders 83 may be positioned within the cargo construct or may be on the exterior side of the cargo construct 50. According to embodiments, the vehicle cargo construct 50 additionally includes a c-shaped outer frame positioned along the edges of the floor 52 and walls 58, 64. The c-shaped outer frame provides increased rigidity at the edges to further strengthen the cargo construct 50.

As shown in FIG. 1, embodiments of the vehicle cargo construct 50 include a bed liner 84 positioned on the exterior surface 54 of the floor 52 of the containment construct 50. According to embodiments, the bed liner 50 is formed of the composite sandwich panel material 10. According to embodiments, the bed liner 84 is removable from the cargo construct 50 such that the bed liner 84 may be removed, easily washed, or replaced.

According to embodiments, the vehicle cargo construct 50 includes a plurality of break lines 88 or corrugations formed in the floor 52, the side wall panels 58, the end wall panels 64, 70, the cap sections 82, the bed liner 84, the wheel wells 76, or a combination thereof. Such break lines 88 provide a predetermined crumple path in the event of an impact so that the composite sandwich panel material 10 of each part crumples and absorbs impact energy. According to embodiments, the break lines 88 are formed by crushing the open area core 12 of the composite sandwich panel material 10 in pre-determined locations.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A vehicle cargo construct comprising:
a floor having an exterior surface and an oppositely opposed interior surface;
a plurality of side wall panels extending from said floor, each of said plurality of side wall panels having an exterior surface and an oppositely opposed interior surface; and
an end wall panel extending from said floor between said plurality of side wall panels, said end wall panel having an exterior surface and an oppositely opposed interior surface;
each of said floor, said plurality of side wall panels, and said end wall panel being formed of a composite sandwich panel material comprising an open area core defining a plurality of pores disposed between a backing sheet and a surface sheet formed of a sheet molding composition (SMC) reinforced with unidirectional fibers wherein the backing sheet is wrapped around the open area core and joined to the surface sheet along all edges of the composite sandwich material with an elastomeric gasket therebetween to fully enclose the open area core and inhibit moisture from entering an interior of the composite sandwich material.

2. The vehicle cargo construct of claim 1 wherein the exterior surface of said floor is defined by the surface sheet of said composite sandwich panel material and the oppositely opposed interior surface of said floor is defined by the backing sheet of said composite sandwich panel material.

3. The vehicle cargo construct of claim 1 wherein the exterior surface of each of said plurality of side wall panels is defined by the surface sheet of said composite sandwich panel material and the oppositely opposed interior surface of each of said plurality of side wall panels is defined by the backing sheet of said composite sandwich panel material.

4. The vehicle cargo construct of claim 1 wherein the exterior surface of said end wall panel is defined by the surface sheet of said composite sandwich panel material and the oppositely opposed interior surface of said end wall panel is defined by the backing sheet of said composite sandwich panel material.

5. The vehicle cargo construct of claim 1 further comprising a second end wall panel extending from said floor between said plurality of side wall panels, said second end wall panel having an exterior surface and an oppositely opposed interior surface.

6. The vehicle cargo construct of claim 1 wherein the surface sheet of the composite sandwich panel material is 0.5 to 4 mm thick.

7. The vehicle cargo construct of claim 1 further comprising a plurality of cap sections positioned along an upper edge of each of said plurality of side wall panels and said end wall panel.

8. The vehicle cargo construct of claim 1 further comprising a bed liner positioned on the exterior surface of said floor.

9. The vehicle cargo construct of claim 1 wherein the open area core of said composite sandwich panel material is an array having a pattern of at least one shape of: hexagonal, circular, rhomboidal, triangular, parallelogram quadrilateral, or regular quadrilateral.

10. The vehicle cargo construct of claim 1 wherein the open are core of said composite sandwich panel material is formed of at least one of thermoplastic and aluminum.

11. The vehicle cargo construct of claim 1 wherein the backing sheet of said composite sandwich panel material is formed of any one of: sheet molding compound (SMC), thermoplastic sheet, dicyclopentadiene (DCPD), or overmolded polyurethane (PU).

12. The vehicle cargo construct of claim 1 wherein the SMC material of the surface sheet is reinforced with unidirectional carbon fibers.

13. The vehicle cargo construct of claim 1 wherein the surface sheet is adhered to a first face of the open area core by a first adhesive layer and wherein the backing sheet is adhered to a second face of the open area core by a second adhesive layer.

14. The vehicle cargo construct of claim 1 wherein said composite sandwich panel material has a cloth embedded in a first adhesive layer between the surface sheet and the first face of the open area core.

15. The vehicle cargo construct of claim 14 wherein at least one of the first adhesive layer and said second adhesive layer of said composite sandwich panel material contacts an interior volume of the open area core.

16. The vehicle cargo construct of claim 1 wherein said composite sandwich panel material has a fill in the pores of the open area core, the fill being at least one of a sound dampening foam, a fire retardant, or a phase change material.

* * * * *